US012668498B2

(12) United States Patent
Smith

(10) Patent No.: US 12,668,498 B2
(45) Date of Patent: Jun. 30, 2026

(54) RECOVERY OF LITHIUM CARBONATE FROM BASIC AQUEOUS LITHIUM CONTAINING SOLUTIONS

(71) Applicant: American Hyperform, Inc., Philadelphia, PA (US)

(72) Inventor: William Novis Smith, Philadelphia, PA (US)

(73) Assignee: American Hyperform, Inc., Philadelphia, PA (US)

( * ) Notice: Subject to any disclaimer, the term of this patent is extended or adjusted under 35 U.S.C. 154(b) by 0 days.

(21) Appl. No.: 19/234,568

(22) Filed: Jun. 11, 2025

(65) Prior Publication Data

US 2026/0001771 A1 Jan. 1, 2026

Related U.S. Application Data

(60) Provisional application No. 63/666,339, filed on Jul. 1, 2024.

(51) Int. Cl.
*C01D 15/08* (2006.01)

(52) U.S. Cl.
CPC .......... *C01D 15/08* (2013.01); *C01P 2006/80* (2013.01)

(58) Field of Classification Search
CPC ...................................................... C01D 15/18
See application file for complete search history.

(56) References Cited

U.S. PATENT DOCUMENTS 4,588,566 A * 5/1986 Kluksdahl ............... C22B 26/12
423/179.5

FOREIGN PATENT DOCUMENTS

| | | | | |
|---|---|---|---|---|
| JP | H08217438 A | * 8/1996 | | |
| KR | 20210131094 A | * 11/2021 | ............... | C01D 7/22 |
| WO | WO-2011133165 A1 | * 10/2011 | ............ | C01D 15/08 |

OTHER PUBLICATIONS

Machine Translation of JPH08217438 (Year: 1995).*
Machine translation of KR20210131094-A (Year: 2021).*
Ahmadi, Marziyeh , et al., "Lithium hydroxide as a high capacity adsorbent for CO2 capture: experimental, modeling and DFT simulation", Scientific Reports (2023) 13:7150; https://doi.org/10.1038/s41598-023-34360-z, 2023, 19 pages.
Kim, Sung-Hwan , et al., "Carbon dioxide utilization in lithium carbonate precipitation: A short review", Environ. Eng. Res. 2024; 29(3): 230553; https://doi.org/10.4491/eer.2023.553, Oct. 22, 2023, 13 pages.

* cited by examiner

*Primary Examiner* — Michael Forrest
(74) *Attorney, Agent, or Firm* — Blanchard Horton PLLC

(57) ABSTRACT

A more efficient and lower waste liquid-phase method for recovering lithium carbonate suitable for high-performance lithium applications from recycled lithium-ion battery and other sources of lithium hydroxide including aqueous solutions is described. The method uses carbon dioxide gas to directly form lithium carbonate from a lithium hydroxide including solution, thus eliminating the need for conventional acid pre-treatment and reducing the need for subsequent sodium carbonate addition.

33 Claims, 1 Drawing Sheet

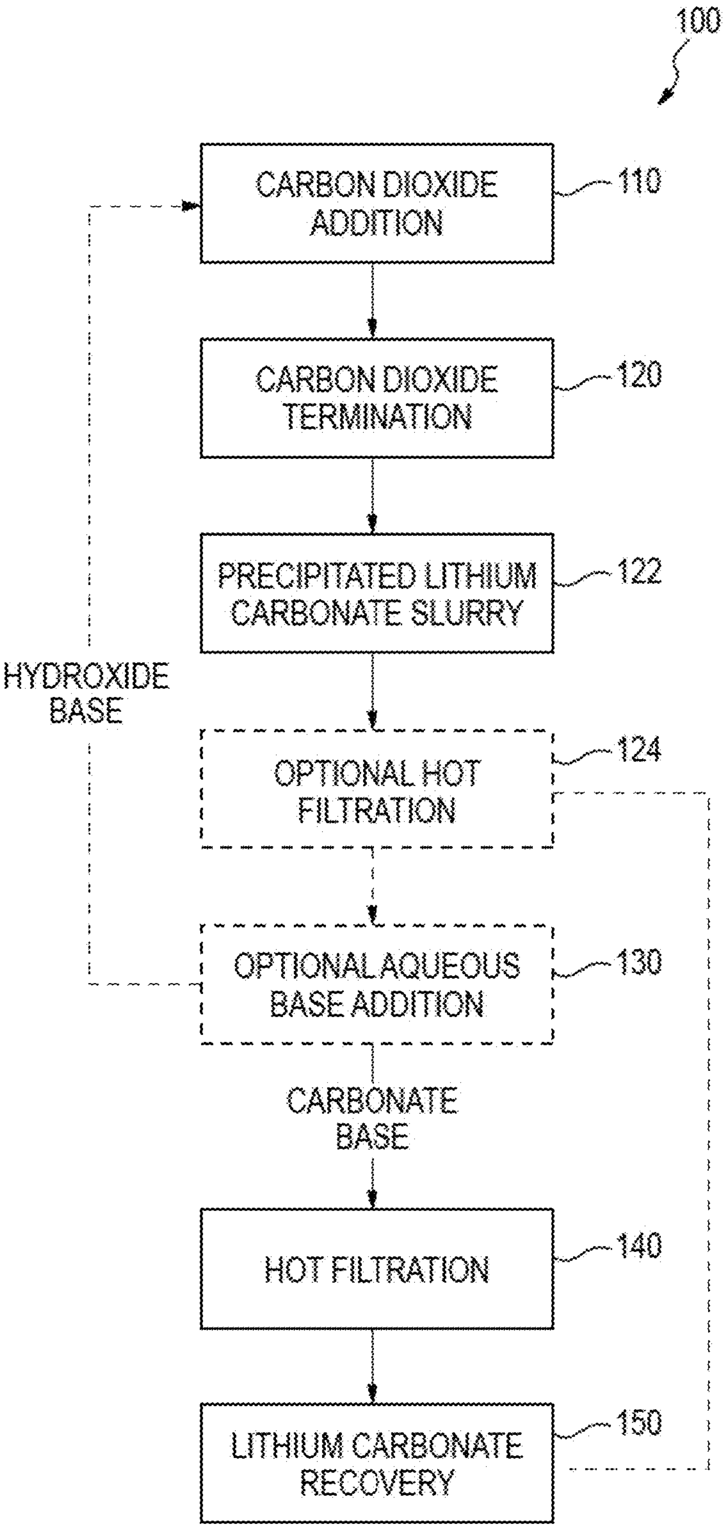
100
CARBON DIOXIDE ADDITION
110
CARBON DIOXIDE TERMINATION
120
PRECIPITATED LITHIUM CARBONATE SLURRY
122
HYDROXIDE BASE
OPTIONAL HOT FILTRATION
124
OPTIONAL AQUEOUS BASE ADDITION
130
CARBONATE BASE
HOT FILTRATION
140
LITHIUM CARBONATE RECOVERY
150

RECOVERY OF LITHIUM CARBONATE FROM BASIC AQUEOUS LITHIUM CONTAINING SOLUTIONS

REFERENCE TO RELATED APPLICATIONS

This application claims the benefit of U.S. Provisional Application No. 63/666,339 entitled "Recovery of Lithium Carbonate from Basic Aqueous Lithium Salt Solutions" filed Jul. 1, 2024, which is incorporated by reference in its entirety.

BACKGROUND

Lithium based batteries are used in all major applications for rechargeable and many non-rechargeable battery applications including automotive vehicles, mobile electronic devices, uninterruptable power supplies, robotic devices, and others. A rechargeable lithium-ion battery depends on a cathode (positive electrode), an anode (negative electrode), and an electrolyte that transfers ions between the cathode and anode. The anode may contain graphite coated on a metal foil, generally a copper metal foil, or a lithium metal foil layered or otherwise coated on a substrate, where the substrate is often a metal foil made from copper.

Although lithium-ion batteries have the highest energy density (Wh/kg) of currently used rechargeable batteries, there is ongoing demand to increase their energy density. For example, increasing the battery energy density of a lithium-ion battery increases the driving range for electric cars, allows physically smaller batteries in mobile phones, and thus increases the range or use time of devices dependent on battery power.

Presently, the highest energy densities for lithium-ion batteries are achieved with a lithium metal anode material system. When such lithium metal anode batteries are chopped, ground, and extracted with aqueous acid and/or base, solutions and suspensions are produced including different lithium salts. Before chopping, grinding, and extraction, the batteries initially may be crushed and the battery materials washed with water, thus subjecting the battery materials to hydrolysis. This hydrolysis of the battery contents directly produces a basic aqueous lithium hydroxide solution also including additional soluble lithium salts and soluble impurities from the lithium metal anode material system and other lithium including materials within the battery.

Processes other than battery recycling also produce basic aqueous lithium hydroxide solutions. One such process is the waste streams from lithium extraction and processing that include lithium hydroxide and may be referred to as basic "process water" waste streams. Another such process is the "bleed liquor" waste stream resulting from the continuous commercial crystallization commonly used to produce $LiOH \cdot H_2O$.

The continuous commercial crystallization of $LiOH \cdot H_2O$ is the last step to produce $LiOH \cdot H_2O$ from lithium containing ores, such as spodumene and lithium containing clays. During the continuous crystallization, additional lithium hydroxide including feed is added to maintain a sufficient lithium hydroxide concentration to drive the crystallization. However, as new lithium hydroxide feed solution is added, a portion of the crystallization solution is concurrently removed as a bleed liquor to limit or reduce the contaminant content of the recrystallization solution. Thus, in addition to battery recycling, lithium hydroxide including waste streams and bleed liquors also provide a basic aqueous lithium hydroxide solution including additional soluble lithium salts and soluble impurities, with the bleed liquor having an enhanced lithium concentration in relation to the battery recycling and lithium hydroxide including waste streams.

Regardless of origin, additional soluble lithium salts that are soluble in water and thus may be present in the basic aqueous lithium hydroxide solution include lithium chloride, lithium sulfate, lithium trifluoroacetate, lithium fluorophosphate, lithium bis-trifluoro ethyl imide, and the like. Similarly, soluble impurities that are soluble in water and thus may be present in the basic aqueous lithium hydroxide solution include sodium ions, calcium ions, bromide ions, potassium ions, chloride ions, and sulfate ions, which may form salts including sodium chloride, sodium sulfate, calcium chloride, magnesium salts, aluminum salts, zinc salts, and borates. Depending on the origin of the basic aqueous lithium hydroxide solution, soluble trace impurities that are soluble in water also may be present in the basic aqueous lithium hydroxide solution, including methanol, ethanol, ethylene glycol, organic carbonates, sulfites, fluorides, rubidium and cesium, and their ions and salts.

One conventional process for converting lithium chloride and lithium sulfate salts into lithium carbonate involves the addition of sodium carbonate (soda ash) to the lithium salts to produce the desired lithium carbonate; however, either sodium chloride or sodium sulfate, respectively, waste streams result. The sodium sulfate waste stream is especially problematic as sodium sulfate has little to no commercial value and cannot be readily disposed of as it will contaminate any water supply or turn soil salty. At present, the sodium sulfate solution is generally deep welled after isolation from potential ground water contamination.

Another disadvantage of the conventional use of sodium carbonate to form lithium carbonate from lithium chloride and lithium sulfate salts is that for every molecule of the desired lithium carbonate, two molecules of sodium chloride or one molecule of sodium sulfate are produced. Thus, from a stochiometric perspective, one molecule of the desired lithium carbonate is produced in relation to two molecules of the undesired sodium chloride in the waste stream.

Hence:

$$2\,LiCl + Na_2CO_3 \longrightarrow Li_2CO_3(s) + 2\,NaCl \quad \text{or}$$

$$Li_2SO_4 + Na_2CO_3 \longrightarrow Li_2CO_3(s) + Na_2SO_4.$$

When this process involves the addition of basic sodium carbonate solution to basic lithium hydroxide solutions, excessive quantities of sodium are often produced in the form of excess sodium carbonate, excess sodium hydroxide, and other sodium salts in the waste stream. Another issue in this instance is that lithium carbonate does not precipitate at the desired yield due to a partial equilibrium.

Hence:

$$Na_2CO_3 + LiOH \longleftrightarrow NaOH + Li_2CO_3(s).$$

Although these excessive waste and equilibrium problems exist, the conventional route used to treat the basic aqueous lithium hydroxide solution includes an initial neutralization with sulfuric acid before the sodium carbonate is added. This results in good recovery of the desired lithium carbonate, but with excessive sodium contamination of the recovered lithium carbonate at or greater than 0.05% by weight in relation to the weight of the total lithium carbonate recovered. Sodium contents at or greater than 0.05% by weight of the recovered lithium carbonate are excessive and make the recovered lithium carbonate unsuitable for use in high-performance lithium applications, such as for use in cathodes for lithium-ion batteries. The $Li_2CO_3$ must be recrystallized to reduce the sodium content for high purity use.

The conventional aqueous recovery methods require the use of sodium, often in stochiometric excess, to precipitate a high yield of the desired lithium carbonate. However, lithium carbonate recovered in this way normally cannot be directly used in high-performance lithium applications due excessive sodium contamination, a problem conventionally addressed by recrystallizing the recovered lithium carbonate to remove the excessive sodium content. However, this recrystallization is time consuming and results in an unwanted loss in lithium carbonate yield.

An additional disadvantage of these conventional aqueous recovery methods is that the final aqueous filtrate remaining after precipitation of the lithium carbonate solid has a relatively high sodium content in relation to the remaining approximately less than 1000 parts-per-million (ppm) lithium concentration. Thus, this high sodium/low lithium remaining filtrate is generally discarded, as it is not economically viable to recover the remaining lithium.

As can be seen from the above description, there is an ongoing need for simple and efficient materials and methods for the aqueous recovery of lithium carbonate from spent batteries and other sources having significant lithium hydroxide content. The materials and methods of the present invention overcome at least one of the disadvantages associated with conventional recovery methods, such as the necessity to acidify the solution with sulfuric acid prior to treatment with sodium carbonate.

SUMMARY

In one aspect, the invention provides liquid-phase method to recover lithium carbonate from a basic aqueous lithium hydroxide solution, the method comprising: agitating a basic aqueous lithium hydroxide solution; adding carbon dioxide to the basic aqueous lithium hydroxide solution; terminating the adding carbon dioxide when a pH of the basic aqueous lithium hydroxide solution decreases to a pH of 8 to 10.5; forming a precipitated lithium carbonate slurry in response to the adding the carbon dioxide to the basic aqueous lithium hydroxide solution; hot filtering the precipitated lithium carbonate slurry; and recovering the precipitated lithium carbonate as a solid.

Other systems, methods, features and advantages of the invention will be, or will become, apparent to one with skill in the art upon examination of the following figures and detailed description. It is intended that all such additional systems, methods, features, and advantages be included within this description, be within the scope of the invention, and be protected by the claims that follow. The scope of the present invention is defined solely by the appended claims and is not affected by the statements within this summary.

BRIEF DESCRIPTION OF THE FIGURES

The invention can be better understood with reference to the following drawing and description.

FIG. 1 represents a method for directly converting the lithium hydroxide in a basic aqueous lithium hydroxide solution into recoverable lithium carbonate with carbon dioxide gas.

DETAILED DESCRIPTION

A more efficient and lower waste liquid-phase method for recovering lithium carbonate suitable for high-performance lithium applications from recycled lithium-ion battery and other sources of lithium hydroxide including aqueous solutions is described. The method uses carbon dioxide gas to directly form lithium carbonate from a lithium hydroxide including solution, thus eliminating the need for conventional acid pre-treatment and reducing the need for subsequent sodium carbonate addition.

In addition to the carbon dioxide providing acidification, the carbon dioxide also provides the negative carbonate ion to the positive lithium metal ion during the carbon dioxide acidification as opposed to the negative carbonate ion being provided by an added solid sodium salt as common in conventional methods. Thus, the need to add sodium carbonate to produce the desired lithium carbonate suitable for high-performance lithium applications is significantly reduced to the point of being substantially eliminated by the claimed method in relation to conventional sulfuric acid processes, as is the need to thus dispose of generated sodium waste streams including sodium sulfate, sodium chloride, and/or sodium carbonate. The only byproduct of the reaction producing lithium carbonate from lithium hydroxide with carbon dioxide addition is water.

FIG. 1 represents method 100 for converting the lithium hydroxide in a basic aqueous lithium hydroxide solution into recoverable lithium carbonate with carbon dioxide. The basic aqueous lithium hydroxide solution preferably contains lithium hydroxide as the primary constituent after water and preferably is filtered to remove solids larger than approximately 1 micrometer. The basic aqueous lithium hydroxide solution also may contain additional soluble lithium salts and soluble impurities, including soluble trace impurities as previously discussed.

In carbon dioxide addition 110, carbon dioxide is added to the basic aqueous lithium hydroxide solution with agitation. The pH of the basic aqueous lithium hydroxide solution is from 11 to 14, preferably from 12 to 14. The carbon dioxide may be in solid, liquid, or gaseous form, with the gaseous form being preferred.

The agitation may begin before, during, or after initiating the carbon dioxide addition, but preferably before and is preferably continued until after the carbon dioxide addition 110 is terminated. The agitation is beneficial to assist in retaining the precipitated lithium carbonate solid suspended in the liquid, thus preventing the precipitated lithium carbonate from significantly settling out on the bottom of the reactor vessel and “trapping” unreacted solution. Agitation is preferably provided by mechanical stirring, adding carbon dioxide gas below the surface of or at the base of the solution while shaking, and the like.

In the solution, the carbon dioxide reacts substantially stoichiometrically with lithium hydroxide to produce solid lithium carbonate. Thus, one carbon dioxide molecule is consumed to form a single lithium carbonate molecule.

Hence:

$$2\,LiOH + CO_2 \longrightarrow Li_2CO_3(s) + H_2O.$$

Advantageously, the addition of carbon dioxide produces nothing "extra", other than additional water. The temperature of the basic aqueous lithium hydroxide solution to which the carbon dioxide is added is maintained at a temperature from 5 to 70 degrees Celsius, preferably from 5 to 50 degrees Celsius, and more preferably from 5 to 30 degrees Celsius.

The carbon dioxide addition 110 is preferably performed near atmospheric pressure; however, other pressures could be used that do not significantly interfere with the formation of lithium carbonate. For example, when gaseous carbon dioxide is used, a near atmospheric pressure of 0.1 kPa to 300 kPa is preferred to maintain gas flow through the agitated solution. Similarly, if solid carbon dioxide is used a near atmospheric pressure of 0.1 kPa to 3 kPa may be used. Higher pressures up to 1000 kPa or 1200 kPa may be used to potentially speed the formation of lithium carbonate but are not required.

In carbon dioxide termination 120, the carbon dioxide addition 110 is ended when the pH of the solution decreases to a pH of 8 to 10.5, preferably 8.8 to 10.2 and more preferably 9.2 to 10. Thus, the carbon dioxide addition 110 is terminated before significant quantities of the much more soluble than lithium carbonate lithium bicarbonate starts to form, which will occur if excess carbon dioxide is added to reduce the pH to a point around 7.5 and lower. Thus, the carbon dioxide addition 110 is terminated in response to the reduction or preferable substantial elimination of lithium bicarbonate formation, as any lithium bicarbonate formed remains in solution and adversely impacts lithium carbonate yield.

One advantage to using gaseous carbon dioxide in relation to the other phases of carbon dioxide is that the amount of carbon dioxide added to the aqueous basic solution of liquid hydroxide may be precisely controlled. The carbon dioxide termination 120 produces a precipitated lithium carbonate slurry 122.

In optional hot filtration 124, the precipitated lithium carbonate slurry 122 may be filtered to remove the precipitated lithium carbonate before continuing to process the filtrate to recover additional lithium carbonate. If performed, the optional filtration 124 is performed by heating the lithium carbonate slurry 122 to greater than 50 degrees Celsius and preferably to greater than 70 degrees Celsius, but less than the boiling point of water, prior to filtering the lithium carbonate slurry 122 to recover the precipitated lithium carbonate. Lithium carbonate solubility decreases with increasing temperature, thus an inverse solubility relationship. An advantage to performing the optional hot filtration 122 is that the lithium carbonate recovered is generally 99.9+% pure in relation to the total recovered weight of lithium carbonate, thus substantially exceeding the purity requirements for high-performance lithium applications.

The optional hot filtration 124 is preferably a small particle filtration that removes solids larger than one micron and may be performed using polypropylene, paper, fiberglass, stainless-steel mesh, and the like as the filtration medium. Presently, polypropylene in the form of a 5-micrometer rated filter cloth is used as may be obtained from Lamport, Metchem, Micronics, IDRO filter Workshop, McMaster-Carr, Kavon Filter Products, and Shelco Filters, for example. The optional hot filtration 124 may also be performed with centrifugation as opposed to a filtration medium or may use a combination of centrifugation followed or preceded with the use of a filter medium. The precipitated and recovered lithium carbonate may be washed with water and dried to provide a solid lithium carbonate powder.

In optional aqueous base addition 130, if the basic aqueous lithium hydroxide solution includes chloride and sulfate salts of lithium, such as lithium chloride, lithium sulfate, and additional soluble lithium salts at a total solution solids content from 0.5% to 30% weight percent, aqueous base may be added to increase the pH of the solution back to 9 to 14, preferably back to 11 to 12. One of two different aqueous base additions may be made.

The first aqueous base that may be used in the optional aqueous base addition 130 is an alkali metal carbonate solubilized in water, with sodium carbonate and potassium carbonate being more preferred as alkali metal carbonates, and sodium carbonate being the most preferred alkali metal carbonate at present. Preferably, the aqueous alkali metal carbonate constitutes from 15% to 20% by weight of the solution used for the optional aqueous base addition 130. The aqueous alkali carbonate base is added until the pH of the previously carbon dioxide acidified, basic aqueous lithium hydroxide solution increases to 9 to 12, preferably to 11 to 12. During the addition of the aqueous alkali carbonate base, the non-lithium hydroxide lithium salts will precipitate as lithium carbonate.

The second aqueous base that may be used in the optional aqueous base addition 130 is an alkali metal hydroxide solubilized in water, with sodium hydroxide and potassium hydroxide being more preferred as alkali metal hydroxides, and sodium hydroxide being the most preferred alkali metal hydroxide at present. Preferably, the aqueous alkali metal hydroxide constitutes from 15% to 50% by weight of the solution used for the optional aqueous base addition 130. The aqueous alkali hydroxide base is added until the pH of the previously carbon dioxide acidified, basic aqueous lithium hydroxide solution increases to 10 to 14, preferably to 11 to 12. The carbon dioxide addition 110 and the carbon dioxide termination 120 may then be repeated on this regenerated basic aqueous lithium hydroxide solution to precipitate additional lithium hydroxide remaining in the solution as lithium carbonate.

In hot filtration 140, the precipitated lithium carbonate slurry 122 is treated as described previously in relation to the optional hot filtration 124. In contrast to the optional hot filtration 124 where lithium hydroxide was the only source of lithium carbonate, in this instance the precipitated lithium carbonate slurry 122 includes lithium carbonate originating from lithium hydroxide and from any additional soluble lithium salts present in the precipitated lithium carbonate slurry 122.

In lithium carbonate recovery 150 the precipitated lithium carbonate may be washed with water, dried, and recovered as a solid powder. The recovered lithium carbonate is preferably from 99.85% to 99.9%+ lithium carbonate by weight in relation to the total mass recovered. Preferably, of the total lithium present in the basic aqueous lithium hydroxide solution, the method 100 recovers from 90% to 99.9% by weight, more preferably from 93% to 99.9% by weight.

The following examples illustrate one or more preferred embodiments of the invention. Numerous variations may be made to the following examples that lie within the scope of the invention.

EXAMPLES

Example 1: Recovery of Lithium Carbonate from the Basic Aqueous Lithium Hydroxide Solution Formed from the Hydrolysis of Crushed Lithium Metal Anode Batteries Using Sodium Hydroxide to Convert any Additional Soluble Lithium Salts to Hydroxide The solution contained lithium hydroxide, additional soluble lithium salts including sulfate, chloride, fluoride, phosphate, and fluorophosphate salts and soluble impurities including methanol, ethanol, ethylene glycol, organic carbonates, and aluminum. The solution contained 1.6% lithium by weight of the total solution (1.1 moles of lithium) and had a pH of approximately 12.

Carbon dioxide gas was bubbled into 500 mL of the filtered recycle solution. The carbon dioxide addition was monitored by equipping a one-liter round bottom reactor including the solution with a bubbler to indicate when excess carbon dioxide was bubbling through. The reactor was also equipped with a pH electrode and the pH monitored during the addition.

The solution was stirred vigorously and cooled to maintain a temperature of 20-30 degrees C. as the carbon dioxide was added, and the rate of carbon dioxide addition was limited to reduce but not eliminate discharge of carbon dioxide through the bubbler. The addition of carbon dioxide was ended when the pH of the solution fell to approximately 9.5.

The reactor was opened and 50% by weight aqueous NaOH solution was added to raise the pH to approximately 12. The reactor was then closed, and the carbon dioxide addition was repeated to again lower the solution pH to approximately 9.5. The reactor was again opened and then the resulting slurry was heated to 70-80 degrees C. for approximately 0.5 hours and then filtered while hot.

A lithium carbonate cake formed on the filter and the cake was washed with a minimum amount of water three times and dried. The recovered lithium carbonate weighed 33.0 g (0.56 moles of lithium) for a yield of 95% by weight in relation to the lithium originally present in the filtered aqueous recycle solution.

Example 2: Recovery of Lithium Carbonate from the Basic Aqueous Lithium Hydroxide Solution Formed from the Hydrolysis of Crushed Lithium Metal Anode Batteries Using Sodium Carbonate to Precipitate any Additional Soluble Lithium Salts as Lithium Carbonate The solution contained lithium hydroxide, additional soluble lithium salts including sulfate, chloride, fluoride, phosphate, and fluorophosphate salts and soluble impurities including methanol, ethanol, ethylene glycol, organic carbonates, and aluminum. The solution contained 1.6% lithium by weight of the total solution (1.15 moles of lithium) and had a pH of approximately 12.

Carbon dioxide gas was bubbled into 500 mL of the filtered recycle solution. The carbon dioxide addition was monitored by equipping a one-liter round bottom reactor including the solution with a bubbler to indicate when excess carbon dioxide was bubbling through. The reactor was also equipped with a pH electrode and the pH monitored during the addition.

The solution was stirred vigorously and cooled to maintain a temperature of 20-30 degrees C. as the carbon dioxide was added, and the rate of carbon dioxide addition was limited to reduce but not eliminate discharge of carbon dioxide through the bubbler. The addition of carbon dioxide was ended when the pH of the solution fell to approximately 9.5.

The reactor was opened and 20% by weight aqueous $Na_2CO_3$ solution was added to raise the pH to approximately 10-11. The resulting slurry was then heated to 70-80 degrees C. for approximately 0.5 hours and then filtered while hot.

A lithium carbonate cake formed on the filter and the cake was washed with a minimum amount of water three times and dried. The recovered lithium carbonate weighed 32.5 g (0.55 moles of lithium) for a yield of 95% by weight in relation to the lithium originally present in the filtered aqueous recycle solution.

Example 3: Recovery of Lithium Carbonate from the Basic Aqueous Lithium Hydroxide Solution Formed as "Process Water" from Lithium Extraction and Processing The process water contained lithium hydroxide and additional soluble lithium salts including sulfate and/or chloride and soluble impurities including sodium and potassium salts. The process water contained approximately 0.5% lithium by weight of the total solution (0.36 moles of lithium and 0.72 Molar) and had a pH of approximately 10.5.

Approximately 500 mL of the process water was adjusted from a pH of approximately 10.5 to a pH of 12 with 50% aqueous sodium hydroxide.

The carbon dioxide addition and filtration as generally described in Example 1 were then performed. The pH was again raised with aqueous sodium hydroxide and the carbon dioxide addition and filtration as generally described in Example 1 were then performed. Approximately 9 grams of carbon dioxide were added over the course of the two carbon dioxide additions. The recovered lithium carbonate weighed 12.6 grams (0.17 moles of lithium) for a yield of 95% by weight in relation to the lithium originally present in the process water. The method was repeated on a different sample of process water and recovered 12.5 grams (0.17 moles of lithium) of lithium carbonate for a yield of 95% by weight in relation to the lithium originally present in the process water.

Example 4: Recovery of Lithium Carbonate from the Basic Aqueous Lithium Hydroxide Solution Formed as the "Bleed Liquor" Solution from Commercial $LiOH \cdot H_2O$ Crystallization The bleed liquor contained soluble impurities including potassium ions and sodium ions. The bleed liquor contained approximately 2.7% lithium (1.93 M) in addition to 0.2% potassium, and 0.3% sodium by weight of the total solution and had a pH of approximately 13-14.

The carbon dioxide and aqueous sodium hydroxide additions and filtration as generally described in Example 1 were then performed on approximately 500 mL of the bleed liquor. In this instance, it took about one hour and approximately 46 grams of carbon dioxide for the solution to reach a pH of approximately 9. The recovered lithium carbonate weighed 70 g (0.95 moles of lithium) for a yield of 95% by weight in relation to the lithium originally present in the bleed liquor.

To provide a clear and more consistent understanding of the specification and claims of this application, the following definitions are provided.

The terms "a", "an", and "the" used in the specification claims are to be construed to cover both the singular and the plural, unless otherwise indicated or contradicted by context. No language in the specification should be construed as indicating any non-claimed element to be essential to the practice of the invention.

The numerical values of the specification and claims are approximations that may vary depending on the desired properties sought to be obtained and the margin of error in determining the values. At the very least, and not as an attempt to limit the application of the doctrine of equivalents to the scope of the claims, each numerical parameter should at least be construed considering the margin of error, the number of reported significant digits, and by applying ordinary rounding techniques.

Unless the context clearly dictates otherwise, where a range of values is provided, each intervening value to the tenth of the unit of the lower limit between the lower limit and the upper limit of the range is included in the range of values.

While the present general inventive concept is illustrated by description of several embodiments, and while these illustrative embodiments are described in detail, it is not the intention of the Applicant to restrict or in any way limit the scope of the general inventive concept to such illustrative embodiments. Instead, the descriptions and drawings should be regarded as illustrative in nature where additional embodiments and modifications will readily appear to those skilled in the art upon reading the description and drawings. Accordingly, departures may be made from the illustrative embodiments without departing from the spirit or scope of Applicant's general inventive concept.

The described methods can be performed in any suitable order unless otherwise indicated or contradicted by context.

Solid means a substance that is not a liquid or a gas at room temperature and pressure. A solid substance may have one of a variety of forms, including a monolithic solid, a powder, a gel, or a paste.

Liquid means a substance that is not a solid or a gas at room temperature and pressure. A liquid is an incompressible substance that flows to take on the shape of its container.

Solutions lack an identifiable interface between the solubilized molecules and the solvent. In solutions, the solubilized molecules are in direct contact with the solvent.

Aqueous solutions are solutions that are primarily water.

While various aspects of the invention are described, it will be apparent to those of ordinary skill in the art that other embodiments and implementations are possible within the scope of the invention. Accordingly, the invention is not to be restricted except considering the attached claims and their equivalents.

The invention claimed is:

1. A liquid-phase method to recover lithium carbonate from a basic aqueous lithium hydroxide solution, the method comprising:

agitating a basic aqueous lithium hydroxide solution;

adding carbon dioxide to the basic aqueous lithium hydroxide solution;

terminating the adding carbon dioxide when a pH of the basic aqueous lithium hydroxide solution decreases to a pH from 8 to 10.5;

forming a precipitated lithium carbonate slurry in response to the adding the carbon dioxide to the basic aqueous lithium hydroxide solution;

adding an aqueous base to the precipitated lithium carbonate slurry;

hot filtering the precipitated lithium carbonate slurry; and recovering the precipitated lithium carbonate as a solid.

2. The method of claim 1, where lithium hydroxide is a primary constituent after water of the basic aqueous lithium hydroxide solution.

3. The method of claim 1, where the basic aqueous lithium hydroxide solution is filtered to remove solids larger than approximately 1 micrometer.

4. The method of claim 1, where the basic aqueous lithium hydroxide solution further comprises additional soluble lithium salts.

5. The method of claim 1, where the basic aqueous lithium hydroxide solution further comprises soluble impurities.

6. The method of claim 5, where the soluble impurities comprise soluble trace impurities.

7. The method of claim 1, where the basic aqueous lithium hydroxide solution has a pH from 11 to 14.

8. The method of claim 1, where the basic aqueous lithium hydroxide solution has a pH from 12 to 14.

9. The method of claim 1, where the carbon dioxide is in a gaseous form.

10. The method of claim 1, where the carbon dioxide reacts substantially stoichiometrically with lithium hydroxide in the basic aqueous lithium hydroxide solution to produce solid lithium carbonate.

11. The method of claim 1, where the agitating the basic aqueous lithium hydroxide solution occurs before the adding carbon dioxide to the basic aqueous lithium hydroxide solution and continues until after the carbon dioxide addition is terminated.

12. The method of claim 1, where the basic aqueous lithium hydroxide solution is maintained at a temperature from 5 to 70 degrees Celsius during the carbon dioxide addition.

13. The method of claim 1, where the basic aqueous lithium hydroxide solution is maintained at a temperature from 5 to 30 degrees Celsius during the carbon dioxide addition.

14. The method of claim 1, where the adding carbon dioxide is performed at near atmospheric pressure.

15. The method of claim 1, where the terminating the adding carbon dioxide occurs when the pH of the basic aqueous lithium hydroxide solution decreases to a pH of 9.2 to 10.

16. The method of claim 1, where the hot filtering the precipitated lithium carbonate slurry comprises:

heating the lithium carbonate slurry to greater than 50 degrees Celsius but less than the boiling point of the slurry to form a heated lithium carbonate slurry; and filtering the heated lithium carbonate slurry to remove solids larger than one micron.

17. The method of claim 16, where the filtering is performed with at least one filtration medium chosen from polypropylene, paper, fiberglass, and stainless-steel mesh.

18. The method of claim 1, where the recovering the precipitated lithium carbonate as a solid recovers from 99.85% to 99.9%+ lithium carbonate by weight in relation to a total mass recovered from the hot filtering the precipitated lithium carbonate slurry.

19. The method of claim 1, where the recovering the precipitated lithium carbonate as a solid recovers from 90% to 99.9% of lithium present in the basic aqueous lithium hydroxide solution by weight.

20. The method of claim 1, where the recovering the precipitated lithium carbonate as a solid produces a solid lithium carbonate without excessive sodium contamination.

21. The method of claim 1, where the recovering the precipitated lithium carbonate as a solid produces a solid lithium carbonate suitable for high-performance lithium applications.

22. The method of claim 1, where the hot filtering the precipitated lithium carbonate slurry comprises:

heating the lithium carbonate slurry to greater than 50 degrees Celsius but less than the boiling point of the slurry to form a heated lithium carbonate slurry; and filtering the heated lithium carbonate slurry to remove solids larger than one micron.

23. The method of claim 22, where the filtering is performed with at least one filtration medium chosen from polypropylene, paper, fiberglass, and stainless-steel mesh.

24. The method of claim 1, where the adding the aqueous base is performed when the basic aqueous lithium hydroxide solution comprises chloride and sulfate salts of lithium and comprises a total solution solids content from 0.5% to 30% weight percent.

25. The method of claim 1, where the adding the aqueous base to the precipitated lithium carbonate slurry is continued until a pH of the precipitated lithium carbonate slurry is increased to 10 to 14.

26. The method of claim 1, where the adding the aqueous base to the precipitated lithium carbonate slurry is continued until a pH of the precipitated lithium carbonate slurry is increased to 11 to 12.

27. The method of claim 1, where the aqueous base is an alkali metal carbonate solubilized in water.

28. The method of claim 27, where the alkali metal carbonate is at least one alkali metal carbonate chosen from sodium carbonate and potassium carbonate.

29. The method of claim 27, where the alkali metal carbonate is sodium carbonate.

30. The method of claim 1, where the aqueous base is an alkali metal hydroxide solubilized in water.

31. The method of claim 30, where the alkali metal hydroxide is at least one alkali metal hydroxide chosen from sodium hydroxide and potassium hydroxide.

32. The method of claim 30, where the alkali metal hydroxide is sodium hydroxide.

33. The method of claim 30, where the terminating the adding carbon dioxide occurs when the pH of the basic aqueous lithium hydroxide solution decreases to a pH of 8.

* * * * *